United States Patent [19]

Niehaus

[11] 3,914,788

[45] Oct. 21, 1975

[54] METHOD AND APPARATUS FOR RECONSTITUTING COLOR IMAGES

[75] Inventor: William R. Niehaus, Cincinnati, Ohio

[73] Assignee: The E. W. Scripps Company, Cincinnati, Ohio

[22] Filed: Mar. 12, 1974

[21] Appl. No.: 450,445

[52] U.S. Cl. .................................................. 358/75
[51] Int. Cl.$^2$ ............................................ H04N 1/02
[58] Field of Search .......................... 358/75, 76, 78; 340/173 LT, 173 LS, 173 LM; 350/150, DIG. 1; 353/31; 355/4, 32; 178/7.3 D

[56] References Cited

UNITED STATES PATENTS

| | | | |
|---|---|---|---|
| 3,123,666 | 3/1964 | Bailey | 358/76 |
| 3,659,270 | 4/1972 | Maldonado et al. | 340/173 LM |
| 3,740,734 | 6/1973 | Maldonado | 340/173 LM |

*Primary Examiner*—Benedict V. Safourek
*Assistant Examiner*—Mitchell Saffian
*Attorney, Agent, or Firm*—Meyer, Tilberry & Body

[57] ABSTRACT

There is provided a method and apparatus for reconstituting a color image on a planar surface, which reconstituted image corresponds to a selected original color image. The apparatus and method comprises means for transmitting to a remote location color separation subimages or prints each having two tones and corresponding to a basic or primary color pattern of the original image. At the remote location, each of the transmitted two tone subimages of the separation prints is reproduced within a image element comprising a generally flat transparent layer of material capable of forming an image therein when concurrently exposed to an electro-magnetic field and a light image, such as the transmitted two tone subimages. After the subimages have been reproduced within the flat transparent screen, light sources of the primary colors are directed through the respective transparent screens to produce each of the two tone images as a primary color light ray. These light rays are then registered on a planar surface to reconstitute the original color image.

18 Claims, 6 Drawing Figures

METHOD AND APPARATUS FOR RECONSTITUTING COLOR IMAGES

The invention relates to the art of reconstituting color images such as color photographs and more particularly to a method and apparatus for reconstituting a color image after transmission of the image to a remote source as color separation prints.

The invention is particularly applicable for reconstituting a color image of a color photograph to be transmitted from a news service to a remote location, such as a local television station, and it will be described with particular reference thereto; however, it is to be appreciated that the invention has much broader applications and may be used in various other situations requiring reconstitution of a color image.

The dissemination of news photographs from a central news agency or service to various local subscribers, such as newspapers and television stations, has become highly developed. Photographs are encoded to a signal and transmitted over narrow-band links, such as telephone lines and AM radio channels, from the news service to the various subscribing stations. At the subscribing station, the coded signal representative of the original photograph is decoded and again reconstructed into its original form. This process is quite successful in transmission of black and white photographs and alpha-numerical information; however, transmission of color images or photographs is highly complex when using this procedure. In accordance with known practice, the color image at the news service or head-end of the system is first divided into color separation prints corresponding to each of three primary colors, i.e. blue, red and yellow. These color separation prints are two tone black and white subimages corresponding to the color composition or pattern of the image for each of the basic colors. These black and white color separation prints are then encoded to appropriate digital or otherwise transmittable coded information. The coded information corresponding to each color separation print is then transmitted by appropriate transmission lines to the separate subscriber stations.

At the subscriber station, the coded information is decoded and each of the color separation prints reformed into new color separation prints corresponding to the three basic colors. In many instances, a fourth color separation print, corresponding to the black in the original photograph, is also transmitted to the local station. This provides better contrast in the final reconstituted color print. After the separate color separation prints have been reconstructed at the subscriber station, they are photographed, generally through a halftone screen. Each of the transmitted color separation prints is photographically processed in accordance with this procedure. The half tone screen used in this photograph process is different for each of the colors to produce a different dot pattern in the resulting photographic reproduction of the color separation prints. This is often accomplished by rotating the half tone screen to three different angles for each of the separation prints. The half tone prints are then developed and used to expose a film corresponding to the basic color of each of the half tone photographs. For instance, the half tone photograph created by the blue color separation print is used to expose a blue film. This process is repeated for each of the separation prints. Thereafter, the color film, exposed by the separate color separation prints, are developed to create the various primary colors in separate transparencies. These transparencies are then overlayed to produce a composite transparency corresponding in color to the original image or photograph. This composite or overlay is generally known as a "color key" and can be used by television stations or newspaper as a color photograph corresponding to the image transmitted from the head-end or news service. Generally, a newspaper uses the color key to determine the quality of a picture since the half tone prints used in making the color key are optically the same as half tone prints used on the final printing process. At a television station, a television camera can be directed toward the color key after it is illuminated. This allows transmission of an image corresponding to the original color image from the news service from the television station. In addition, a reconstituted color image can be reproduced from the color key as a color photograph and viewed by a television camera.

As can be seen, the process for reconstituting a color image or photograph after transmission to the subscriber stations is quite complex and involves a plurality of photographic processes. These processes are time consuming; therefore, often the television stations will show only black and white photographs of relatively current news items.

With the advent of digital encoding and decoding means, the transmission time and cost of color separation gray prints by the wire services is becoming quite low. However, this in itself does not allow rapid reconstitution of color photographs at the television subscriber. The present invention relates to a means for improving the processing time and procedure after the color separation gray prints have been received at the television receiving stations as separate color separation prints for each of the basic colors.

In accordance with the invention, there is provided a method and apparatus wherein the subimages or color separation prints, that are transmitted by appropriate means to a subscriber station, are each exposed to a generally flat transparent screen formed from a transparent layer of material capable of forming an image therein when concurrently exposed to an electromagnetic field and a light image. The two-tone gray subimages of the transmitted color separation prints are each focused onto one of the flat transparent screens while the screen is subjected to an electromagnetic field whereby the subimages from the color separation prints are each reproduced in the transparent layer of one of the transparent screens. A light source of a basic color corresponding to the color separation prints is then directed through each of the flat screens to produce a color light ray for each of the basic colors. These light rays have color patterns determined by the subimages of the transparent screens. These basic color light rays are then focused simultaneously onto a planar surface and adjusted or registered on the planar surface and combine to produce a final reconstituted color image corresponding to the original color image.

By this method and apparatus, there is no photographic processing of the color separation prints at the subscriber station. When the image is displayed on the planar surface, a television monitor can receive the color image and transmit it from the television station in color corresponding to the original color image or photograph. In accordance with the preferred embodiment of the invention, the transparent screen can be reused by again creating an electromagnetic field in the screen together with exposure of the screen to a uniform light source. In this manner, the screens can be reused or stored for future use.

In accordance with the preferred embodiment of the invention, the flat transparent screen is an image storing ceramic plate using the longitudinal electro-optic scattering effect found in coarse-grained (grain size > 3 $\mu$) rhombohedral-phase lead-lanthanum-zirconate-titanate (PLZT) ceramics. In plates of these ceramic materials poled normal to the major surfaces, incident light is multiply scattered as it is transmitted, and the intensity of scattered light depends on the ferro-electric remanent polarization state of the plate. This longitudinal electro-optic scattering effect is used in the plate which can be generally defined as a ferroelectric-photoconductor (FE-PC) device that is capable of storing photographic images with reasonably high resolution and good gray scale. The basic flat screen used in practicing the present invention is a conventioonal four-layer FE-PC structure consisting of a coarse-grained PLZT ferroelectric ceramic layer and a photoconductive film between two transparent electrodes. The preferred embodiment of this structure utilizes a polyvinyl carbazole (PVK) photoconductive film and tin oxide-doped indium oxide ($In_2O_3$) transparent electrodes. Image storage is achieved by spatial variation of the light scattering in the ceramic layer which is accomplished by concurrently subjecting the screen to an image and a voltage across the electrodes. The polarity of the voltage determines the orientation of the domains in the ceramic layer which can produce a positive or negative reproduction of the image.

Other types of ceramic FE-PC device can be used for the flat transparent screen. These devices use either fine-grained lead zirconate titanate or PLZT ferroelectric ceramics as image-storage media. Images are stored as a spatial variation of birefringence which used polarized narrow-spectral-bandwidth light for viewing or projection. In these other devices a preferred orientation of the ferroelectric polarization is established in the plane of the ceramic layer prior to image storage by using either a transverse electric field or a uniform tensile or compressive strain bias.

In summary, the flat transparent screen, in accordance with the preferred embodiment of the invention, includes a PLZT ceramic layer having a thin photoconductive film applied to one surface and sandwiched between two transparent electrodes. To use the electro-optic effect, the ceramic is first exposed to a uniform field of light while, at the same time, a voltage is applied across the photoconductor film and the ceramic layer utilizing the spaced, transparent electrodes. This aligns the photo-electric domains of the ceramic layer in a common direction. When storing an image on the flat screen, the voltage is again applied to the electrodes while the photoconductive film is exposed to the desired image from the separation prints or other image surfaces. The degree of light falling at various positions on the ceramic layer and photoconductive film combination changes the alignment of the photo-domains in the ceramic layer in proportion to the amount of light falling on the surface while the electrodes are subjected to a voltage. This records or stores the image in the ceramic layer. After exposure to the image and electro-magnetic field has been removed, the image on the ceramic layer can be viewed, either directly, or by projection, by passing light through the ceramic layer. The light is scattered more by the switched domain, with shades of gray being controlled largely by the degree of domain switching within the ceramic layer. When the ceramic is again prepoled by subjecting the ceramic layer to a uniform light source and applying a voltage to the electrodes, the photoelectric domains are again aligned and the image is erased from the ceramic layer and the screen is cleared.

The flat transparent screens used in the process, as described above, consist of a PLZT ceramic layer having a thin photoconductive film applied to one surface and sandwiched between two transparent electrodes. This total structure is transparent and the image is formed in the ceramic layer. When the ceramic layer is exposed to a uniform field of light while at the same time having a voltage applied across the photoconductive film and ceramic layer by the transparent electrodes, the photoelectric domains within the ceramic layer are aligned in a common direction. To store an image in the layer, the voltage applied across the electrodes has the opposite polarity from the clearing or pre-polarizing voltage. When the ceramic layer is exposed to a light image, the degree of light falling on the various stages of the ceramic layer and photoconductive film changes the alignment of the photoelectric domains in proportion to the amount of light falling on the ceramic layer. This image is exposed to the PLZT screen for sufficient time to allow stabilization of the image within the ceramic layer. Thereafter, both the light source having the image and the electric field are removed. When the image in the ceramic layer is viewed, either directly or by a projector, light passing through the ceramic layer is scattered more by the "switched" domains than by the other domains. The shades of gray are controlled largely by the degree of switching for the individual domains. Consequently, the image produced within the layer has a good gray resolution when viewed with light extending through the ceramic.

Other uses of the transparent screens for creating an image transmitted to a remote station are disclosed in my prior patent applications Ser. No. 359,344 filed May 11, 1973, now U.S. Pat. No. 3,857,635 and Ser. No. 419,410 filed Nov. 27, 1973. These applications are incorporated by reference herein.

By using the present invention, color separation prints received in facsimile form over the wire services can be transformed to a color reproduction for use by television stations without any developing process normally used in transmitting color photographs. Consequently, the time and man power used in receiving and reconstituting color images such as photographs is substantially reduced. By using this invention, a relatively short lead time is required for use of transmitted color photographs. In the past it has required approximately 35 to 40 minutes for the completion of a color facsimile and reconstitution at a remote station. By using the present invention, the approximate time is less than 10 minutes and there is no necessity for photographic equipment and chemicals used in prior photographic processes for reconstituting transmitted color separation prints.

The primary object of the present invention is the provision of a method and apparatus for reconstituting a color image transmitted to a remote location, which method and apparatus is relatively inexpensive to use and requires a minimum of capital equipment.

Another object of the present invention is the provision of a method and apparatus for reconstituting a color image transmitted to a remote location which method and apparatus require no photographic processing or equipment.

Yet another object of the present invention is the provision of a method and apparatus for reconstituting a color image transmitted to a remote location which method and apparatus employ a more definitive color separation two-tone print than prior such method and apparatus.

Yet another object of the present invention is the provision of a method and apparatus as defined above which require only a visual registering process for reconstituting the color image.

Yet another object of the present invention is the provision of a method and apparatus as defined above which include components which can be erased and reused or can be stored for reconstituting the same color image at a later date.

These and other objects and advantages will become apparent from the following description taken together with the accompanying drawings in which.

Figure 1:
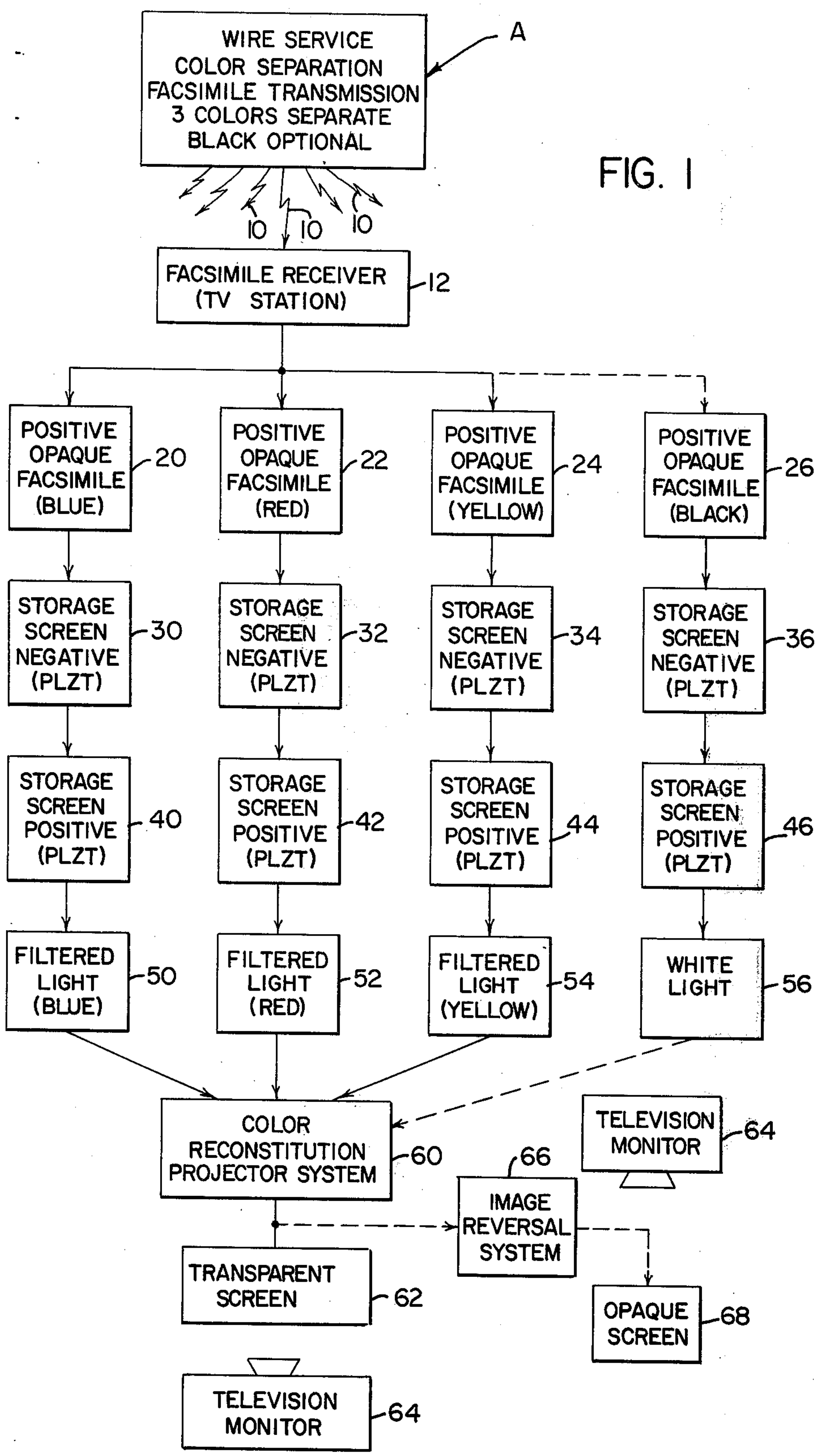
FIG. 1 is a block diagram illustrating, schematically, operating characteristics of the preferred embodiment of the invention.

Referring now to the drawings wherein the showings are for the purpose of illustrating a preferred embodiment of the invention only and not for the purpose of limiting the same, FIG. 1 illustrates a system employing the preferred embodiment of the present invention. In accordance with this illustrated embodiment, a wire service or head end A, produces three color separation facsimile prints in accordance with known practice. These prints are encoded and transmitted across appropriate lines 10, which may be telephone lines or AM radio transmission channels, to a remotely located subscriber 12, each of which has a facsimile receiver. In accordance with the preferred embodiment of the invention, the subscriber is a television station which receives the color separation prints and reconstitute the prints into a color photograph for transmission by the station to its viewers. The signal received from transmission line 10 is decoded into positive opaque facsimiles 20, 22, 24 and 26 in accordance with normal practice. Although only three color separation prints or facsimilies are required, facsimile 26 is used to make a more distinct final color photograph. As so far described, the system is constructed in accordance with normal practice and may take a variety of different encoding, transmission and decoding structures. After the opaque facsimilies 20, 22, 24 and 26, have been received, they are processed in accordance with the present invention. As is known, the facsimiles or color separation prints each include a two tone subimage that corresponds to the pattern of a primary or basic color in the original photograph. Facsimile 20 includes a two tone subimage which corresponds to the pattern of blue of the original image being transmitted. In a like manner, the two tone subimage of facsimile 22 corresponds to the red pattern of the original image, and the two tone subimage of facsimile 24 corresponds to the yellow pattern of the original image. Facsimile 26 is a two tone subimage corresponding to the black portions of the original image or photograph. Each of the subimages in the facsimiles has a first tone corresponding to the existence of the primary color and a second tone corresponding to the absence of such color in the original color photograph. The transmission and receipt of these positive opaque facsimiles is well known in the art of transmitting photographs to remote locations or stations. These facsimiles are positive two tone shades of black, i.e. gray, subimages. Each of these positive subimages will produce a light ray pattern of a selected primary color when placed into a transparency form and illuminated by a light corresponding to its primary color. The primary colors used in the preferred embodiment are blue, red and yellow; however, it is possible to use other combinations of colors to practice the present invention.

In accordance with the present invention, the positive opaque color separation prints or facsimiles 20, 22, 24 and 26 are used to create a corresponding subimage in storage screens 30, 32, 34 and 36, respectively. These subimages are the negative of the positive facsimiles received from the wire service and are now in a transparency form which can be used to produce transparencies of the exact positive subimages on opaque facsimiles 20–26. As will be explained later, the screens 30, 32, 34 and 36 are constructed of PLZT crystal layers which can receive an image when an electro-magnetic field is created in the screen at the same time that an image is exposed or focused onto the storage screen. The particular details of the PLZT storage screens are described in the introductory portion of this specification. The subimages in transparency negative form which appear in the storage screens 30, 32, 34 and 36 are transmitted into transparency positive subimages in storage screens 40, 42, 44, and 46 respectively. These second storage screens are essentially the same as the first storage screens and are used to produce a positive of the subimage which was transmitted to the receiver 12 from wire service A. After storing the subimages from screens 30–36 into screens 40–46, the screens 40–46 can be used to reconstitute the original image since the subimages correspond to the subimages of facsimiles 20–26 and are in transparency form. Reconstitution is accomplished by directing one of the filtered light sources 50, 52, 54 and 56 through the storage screens 40–42, 44 and 46, respectively and into a color reconstitution projection system 60. The particular filtered light used for the individual positive storage screens is selected to correspond with the color of the subimage captured in the positive storage screens. Consequently, the filtered light sources are combined with the positive storage screens to develop separate light rays. These rays carry the color reproduction of the separate facsimiles 20–26 and are combined in color reconstitution projection system 60 to produce a single colored image in a manner to be explained in more detail. The color image can be shown on a transparent screen 62 which is exposed to a television camera 64. In this manner, the reconstituted color image can be transmitted to the television viewers. As an alternative, the color reconstitution projection system 60 can include an image reversal system 66 to project the color image onto an external opaque screen 68. In this situation, television camera 64 can view the opaque screen and transmit the reconstituted color image to the television viewers.

By using the PLZT image storing screens, the separate color separation subimages can be created in separate transparent image surfaces and can be subjected to primary light sources to reconstitute the color separation images without any photographic reproduction equipment. If the transparent storage screens 30–36 and 40–46 are to be used again, they are subjected to an electro-magnetic field and a uniform light source which erases the sublimage and allows reuse of the screens. If the color images are to be retained, the four screens can be stored for subsequent use. It may be possible to employ only one set of PLZT image storing screens by properly inverting the positive two-tone subimages in the facsimiles 20–26 into a negative subimage. Then this negative subimage could be converted to positive two-tone subimages in the storage screens 40–46.

The image storage screens 30–36 and 40–46 are generally flat transparent screens formed from a transparent layer of material capable of forming an image therein when concurrently exposed to an electromagnetic field and a light image. These screens, in accordance with the preferred embodiment of the invention, include electrode means for selectively creating the electro-magnetic field within the transparent layer. The transparent layer is formed from a ceramic material which comprises lead, lanthanum, zirconate titanate. This type of image storage device is well known and is available for storage of images in accordance with the principles of the present invention. The images stored have a high resolution either positive or negative and can be stored indefinitely without refreshing. The screens can be erased either selectively or totally. These storage screens, which are referred to as PLZT ceramic plates or screens, have a thin photoconductive film applied to one surface of the ceramic material and this combination is sandwiched between two transparent electrodes. When the ceramic layer is exposed to a uniform field of light while at the same time having a voltage applied across the photoconductive film and the ceramic layer by the transparent electrodes, the photoelectric domains within the layer are aligned in a common direction. This prepares the layer for subsequent image storing. To store an image, the voltage applied across the electrode is of the opposite polarity to that used in aligning the domains. When the opposite polarity is applied across the electrodes, an image focused onto the photoconductor film is stored within the ceramic layer. The degree of light falling upon various stages of the ceramic, photoconductor film combination changes the alignment of the photoelectric domains in the layer in proportion to the amount falling upon each area of the surface of the screen. After such exposure, the image and the electric field are both removed. The image within the ceramic layer can then be viewed, either directly or by projection, by passing a light through the ceramic layer. This light is scattered more by the switched domains than by the unswitched domains. The shades of gray are controlled largely by the degree of switching of the respective domains within the ceramic layer. Thus, a high resolution image is captured within the ceramic layer for viewing with a light passing through the layer. To remove the image stored within the ceramic layer, the ceramic, photoconductor film combination is again prepoled by flooding a uniform light source onto the ceramic layer and applying a voltage of the first mentioned polarity. The photoelectric domains within the ceramic layer are again aligned and the image caused by the switching of the domains disappears from the layer. This is a general description of the operating characteristics of the PLZT storage screens contemplated in the preferred embodiment of the present invention. A more detailed description has been given in the introductory portion of the specification.

Referring now more particularly to FIG. 1, an embodiment of the invention is shown for creating the positive subimage corresponding to the primary color blue in storage screen 40. A similar system is employed for storing the subimages for the primary colors red and yellow in PLZT storage screens 42, 44 and in the optional black storage screen 46; therefore, a description of the system for storing the subimage in the blue positive screen 40 applies equally to the systems for creating a subimage in the other positive storage screens. In accordance with the illustrated embodiment of the system shown in FIG. 2, a uniform light source 70 is directed toward a movable reflector or mirror 72, shiftable by an appropriate means between the solid line position and the dashed line position. Means are provided for supporting the blue positive facsimile separation print 20 and the negative PLZT screen 30 in mutually parallel relationship on opposite sides of reflector 72. An opaque shield 74 is positioned above screen 30 and is movable between the solid line position and the dashed line position. Power is supplied to the spaced electrodes of PLZT screen 30 by an appropriate power supply 76 controlled by unit 78. This unit turns on the power supply, controls the polarity of the voltage applied to the electrodes within screen 30 and determines the time that power is applied to the electrodes. In the system so far described, prepolarization of screen 30 can be accomplished by shifting the reflector or mirror 72 to the dashed line position, maintaining shield 74 in the solid line position, turning on uniform light source 70 and energizing power supply 76 to create an electromagnetic field within the ceramic layer of screen 30.

Figure 2:
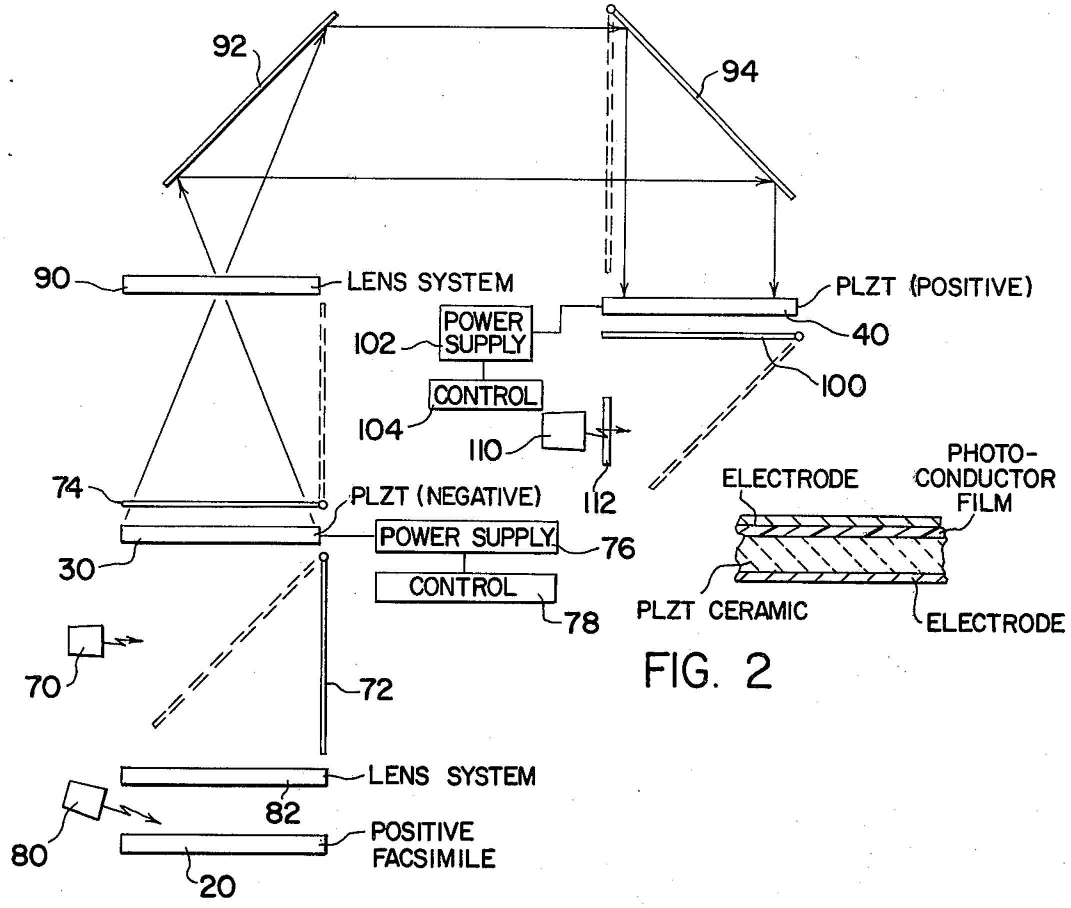
FIG. 2 is a schematic drawing illustrating a portion of the preferred embodiment of the present invention.

A schematic cross-section of screen 30 is shown in the lower right hand portion of FIG. 2. This type of image storage screen is well known in the art and is a screen being used for storage of images as disclosed in my prior application incorporated by reference herein. Control 78 determines the time that the proper polarity is applied to the electrodes of screen 30. Thereafter, the power supply is turned off and light source 70 is turned off. Consequently, the domains within the ceramic layer of screen 30 are aligned and there is no image captured within the transparent ceramic layer. Of course, all layers of the screen 30 are transparent so that light can be directed therethrough to illuminate and project any image on the screen.

FIG. 2 illustrates one embodiment of a device for focusing the subimage from color separation print or positive facsimile 20 onto the storage screen 30. In accordance with the illustrated embodiment, a light source 80 is used to illuminate the surface of facsimile 20. A lens system 82 of an appropriate design focuses the image carried by the positive facsimile or color separation print 20 onto screen 30 when the reflector or mirror 72 is shifted to the solid line position. During this focusing operation, shield 74 remains in its solid line position. Of course, the focusing procedure takes place after prepolarization of screen 30 to remove any image stored therein. With the image or subimage of facsimile 20 focused onto screen 30, power supply 76 is again energized by control 78 with an opposite polarity. This allows switching of the domains within the ceramic layer of screen 30 to capture by the switching process the image or subimage on facsimile 20 within ceramic layer of screen 30. After a sufficient time to allow the domain switching process within the ceramic layer of screen 30, control 78 de-energizes power supply 76. When this is accomplished, a negative of the positive image on surface 20 is captured and stored within screen 30. The white areas of the subimage on facsimile 20 causes more switching than the dark areas or black areas. By controlling the time of the switching process or procedure, the degree of demarcation can be controlled. This produces a relatively sharp negative of the subimage on facsimile 20 within screen 30. The white areas of positive facsimile 20 correspond to the blue areas of the original image. The black portions of the facsimile correspond to the lack of blue in the original image. Consequently, the subimage captured or stored within screen 30 is the opposite. To allow projection of a blue light ray as will be explained later, the subimage in screen 30 is reversed to a positive blue subimage in screen 40 which corresponds to the subimage on facsimile 20. To accomplish this, a variety of systems could be employed. Screen 40 could be mounted in a position above screen 30 so that the image on screen 30 could be focused directly onto screen 40. In this case, the image would be applied from the bottom of screen 40 and would require an inversion of screen 40 during the subsequent projection process. To eliminate the necessity for reorientation of screen 40, the system shown in FIG. 2 for transferring the subimage of screen 30 to screen 40 is employed. In this illustrated embodiment, reflector or mirror 72 is shifted to the dashed line position and shield 74 is shifted into the dashed line position. A lens system 90 of appropriate design directs the subimage of screen 30 onto a reflector or prism 92. The image is then reflected by a movable reflector or mirror 94 onto the upper surface of PLZT positive screen 40. With the reflector or mirror 72 in the dashed line position, light source 70 is directed through transparent screen 30 for the projection and reflection process using lens system 90, reflector or prism 92 and reflector or mirror 94. Lens systems 90 is adjustable to focus the subimage onto screen 40. Before this focusing process, if necessary, screen 40 is prepolarized to remove any image captured or stored therein. To accomplish this, there is provided a lower movable reflector 100 shiftable between the solid line position and the dashed line position. A power supply 102 controlled by a mechanism or unit 104 corresponds to the power supply 76 and unit 78 associated with screen 30. A uniform light source 110 is directed against the reflector or mirror 100 when in the dashed line position to flood a uniform white light against the lower surface of PLZT positive screen 40. When this is done, the appropriate polarity voltage is applied by power supply 102 across the electrodes of screen 40. The polarity and time of this voltage is controlled by unit 104. After a sufficient time, the electro-domains in the ceramic layer of screen 40 are aligned and any image therein is erased. Of course, an appropriate screen or shield similar to shield 74 could be used above screen 40 during the prepolarization procedure. A filter 112 to produce a primary color light ray or beam is removably positioned in front of uniform light source 110. During the prepolarization operation, this filter is removed so that the light source directed to the under surface of screen 40 is a uniform white light. Filter 112 is used during the projection process which will be explained later.

After prepolarization of screen 40 to remove any prior image stored within the screen, reflector 100 is shifted into the solid line position. Reflector 94 is shifted into the solid line position and reflector or mirror 72 is shifted into the dashed line position. Screen 74 is shifted into the inoperative position shown by dashed lines. When this happens, a uniform light source 70 reflects from reflector 72 through screen 30 and is focused by lens systems 90 onto the upper surface of screen 40 by way of reflectors 92, 94. Power supply 102 is energized by unit 104 with the appropriate voltage and polarity being applied across the internal electrodes of screen 40 for a sufficient time to capture or store the subimage of screen 30 in screen 40. This will be a positive subimage corresponding to the subimage on facsimile 20. This subimage corresponds to the blue of the original transmitted image. The same procedure is used to create the screens 42,, 44 and 46 corresponding to the primary colors red and yellow and the black of the original image. These four positive PLZT storage screens are then used to reconstitute the original image in accordance with the projection system hereinafter explained in detail.

Figure 4:
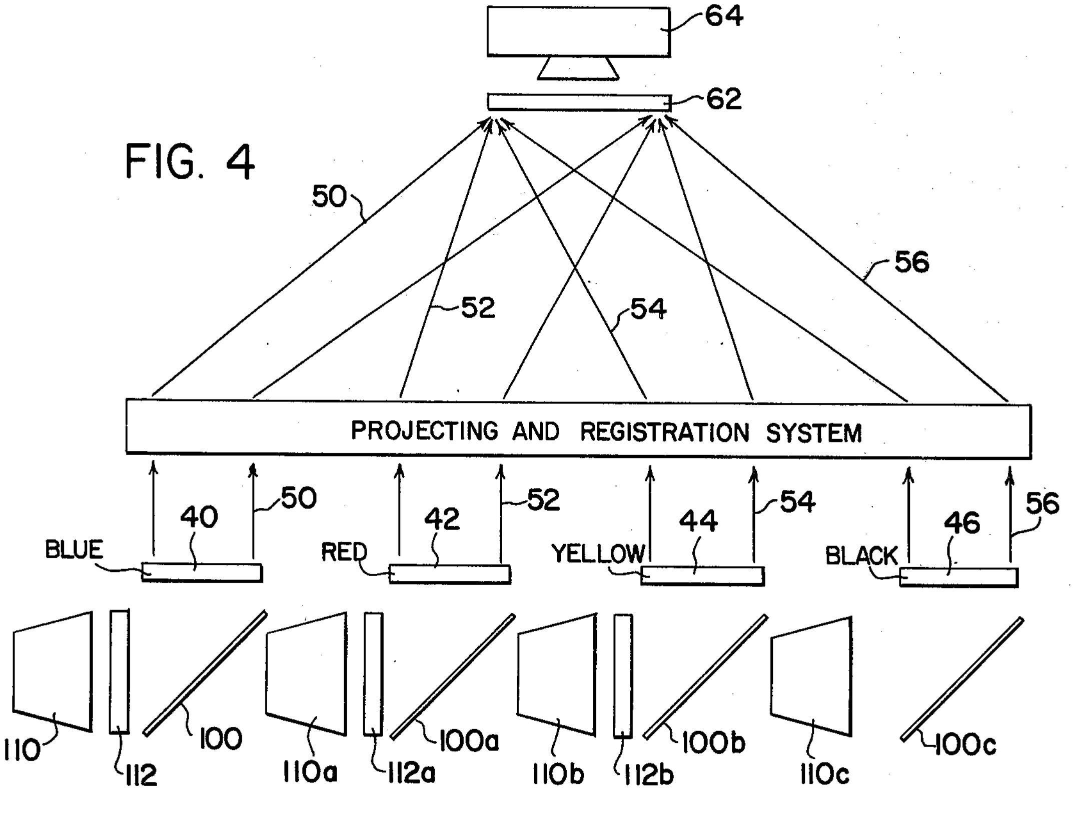
FIG. 4 is a schematic diagram illustrating still further characteristics of the preferred embodiment of the present invention.
Figure 3:
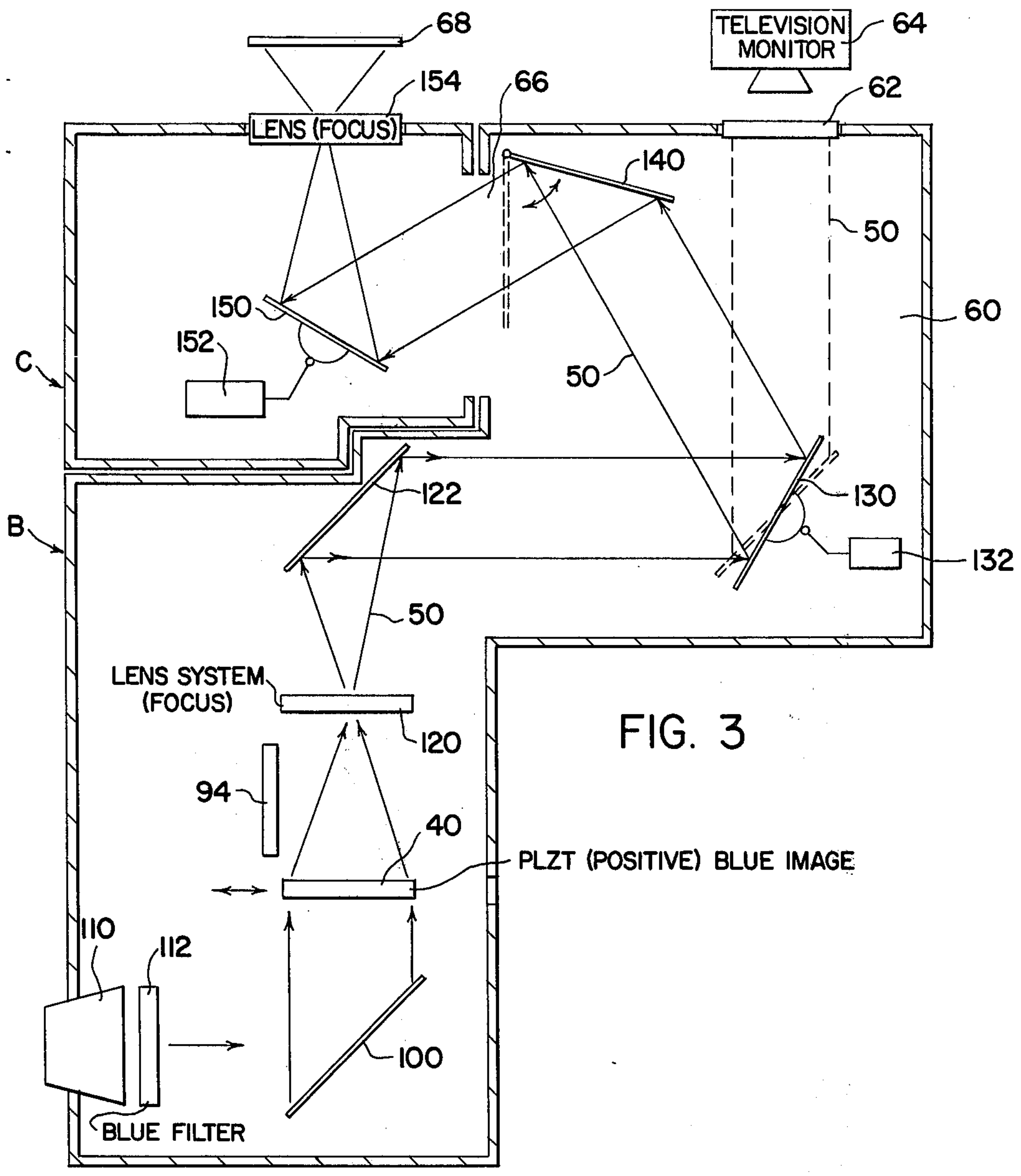
FIG. 3 is a schematic drawing illustrating other characteristics of the preferred embodiment of the present invention.

The projecting and registering system contemplated in the illustrated embodiment of the invention is shown in FIG. 3, wherein the projection and registering system for the blue subimage is described in detail. This description applies equally to the other two or three subimages used in reconstituting the original color image transmitted from the news service A shown in FIG. 1. In accordance with the illustrated embodiment, positive PLZT screen 40, having a positive of the blue subimage, is positioned within housing B. This housing can be combined with the housing in which the structure of FIG. 4 is located or can be a separate housing. When using the same housing, the same uniform light source 110 and reflector 100 may be used for the projection system. If a separate housing is used, then a different light source may be employed. The illustrated embodiment shows the use of the same light source. In this manner, the PLZT positive screen 40 need not be removed from the position shown in FIG. 2. Reflector 94 is shifted into the solid line position of FIG. 3 for the projection operation. This position corresponds to the dashed line position of FIG. 2. Reflector 100 is shown in FIG. 3 in a position corresponding to the dashed line position of FIG. 2. The filter 112 for creating a blue light ray or beam is positioned in front of light source 110 for projecting a blue light from reflector 100 to the lower surface of screen 40. The transparent screen thus creates a blue light ray 50 corresponding to the subimage captured or stored within positive PLZT image screen 40. This light ray is focused by a focusing lens system 120 and is directed to an angularly disposed reflector or mirror 122. In this manner, the blue image light ray 50 is transferred to the surface of an adjustable reflector 130 which is universally movable by an appropriate adjusting mechanism 132 which allows shifting of the blue light ray 50 in all directions. Mechanism 132 can have any appropriate design and can be manually or automatically operated. In accordance with one embodiment of the invention, reflector 130 is adjusted to the dashed line position which reflects the blue image light ray 50 upwardly against a transparent screen 62 which is viewed by television monitor 64. By the use of a separate adjustable reflector 130 for each of the positive PLZT storage screens 40, 42, 44 and 46, light rays carrying the subimages from each of these screens can be simultaneously displayed on screen 62. When this is done, mechanisms 132 are adjusted to register all of the subimages until they correspond or register. Of course, registering indicia can be transmitted on the facsimiles 20–26 or can be added during the processing period. Without such indicia, visual inspection of screen 62 can be used for manually adjusting the three or four subimages until they overlay to produce a concurrent registered color image corresponding to the original color image. (This process is similar to that used in view finders of some cameras). Television camera 64 views the color image on transparent screen 62 and transmits it to the viewers of a news program.

The embodiment of the invention illustrated in FIG. 3 shows a further modification wherein the color image may be projected onto an externally positioned opaque screen 68. A variety of systems could be used to accomplish this function; however, in accordance with the illustrated embodiment, an auxiliary housing C is secured with respect to housing B. A movable reflector 140 is shiftable between the solid line operative position and the dashed line inoperative position. When in the operative position, reflector 140 reflects the blue light ray 50 onto a universally adjustable reflector 150 controlled by a mechanism 152, similar in operation to mechanism 132 controlling reflector 130. From reflector 150, the blue light ray is focused by a lens system 154, which reverses the image, onto the external opaque screen 68. Of course, a separate adjustable reflector 150 is used for each of the primary color light rays being used to reconstitute the transmitted color image. As illustrated in FIG. 3, reflector 130 for each of the separate subimages is adjusted to reflect the subimage light rays into housing C and from the housing onto screen 68. After the several subimages are simultaneously projected on screen 68, they may be registered manually by adjusting the reflectors 130, 150. The color image on external screen 68 is exposed to television camera 64 for transmission of the reconstituted color image during television programming. The particular angles and dispositions for the various components of FIG. 3 are not to scale since they are shown only to illustrate the operating characteristics of the present invention. Adjustments may be made to convey the separate color subimages to a single planar surface where they are registered as a reconstituted color image corresponding to the transmitted image.

Figure 5:
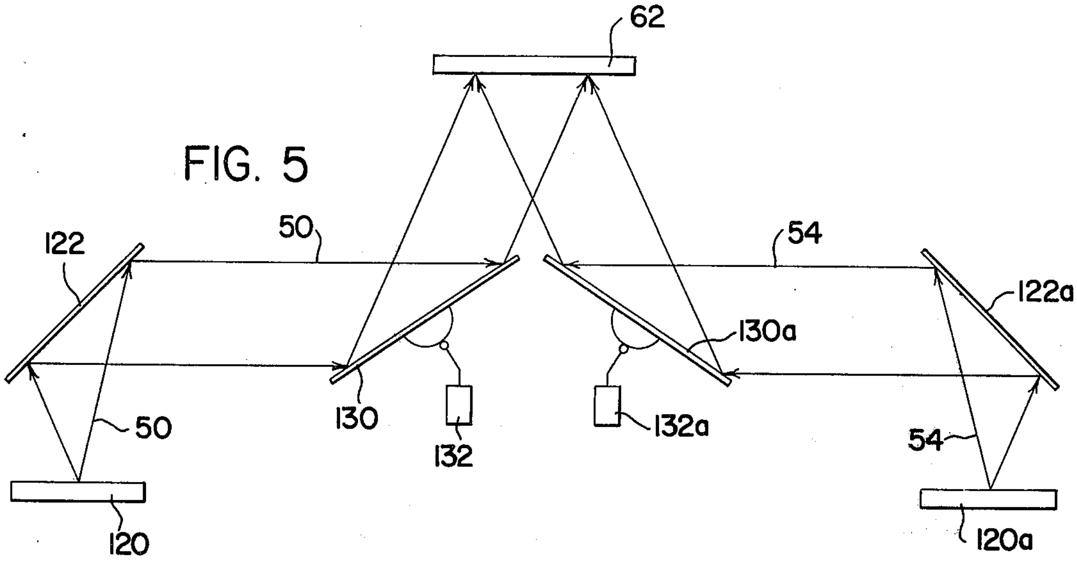
FIG. 5 is a diagram illustrating the process of adjusting and registering the light rays in accordance with the illustrated embodiment of the present invention; and, FIG. 6 is an orientation diagram showing the color orientation used in the structure illustrated in FIG. 5.
Figure 6:
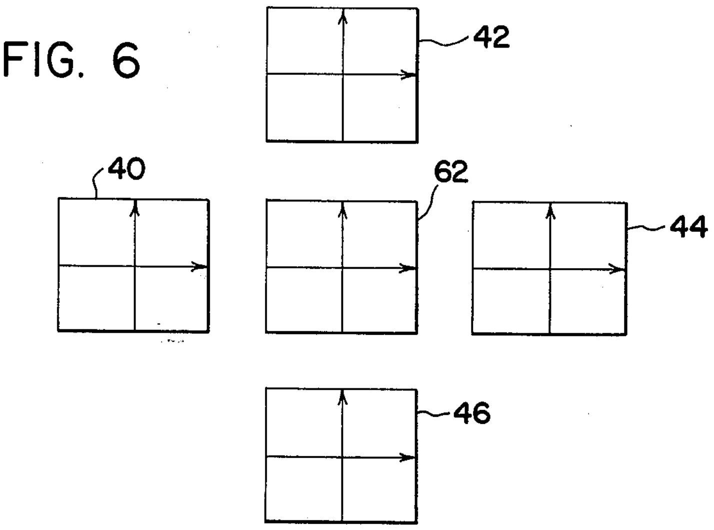

Referring now to FIG. 4, the concept of simultaneous projection of the subimage light rays 50–56 is schematically illustrated. The red, yellow and black subimages in PLZT positive storage screens 42, 44, 46, respectively, are illuminated by light sources 110*a*, 110*b*, 110*c* through reflectors 100*a*, 100*b*, 100*c*, respectively. A filter 112*a* creates a red light source for screen 42. A filter 112*b* creates a yellow light for screen 44. Finally, light source 110*c* has no filter so a white light is used to illuminate screen 46 which corresponds to the black portion of the reconstituted color image. This creates the subimage light rays 50–56 which are simultaneously directed through separate portions of the projecting and registration system shown in FIG. 3. Each of these rays falls upon a separate reflector 130 and is projected by these separate reflectors, simultaneously onto screen 62. This feature is illustrated in FIG. 5 wherein the blue and yellow systems in housing B are illustrated. Of course, four separate systems are spaced around screen 62 to simultaneously direct the light rays 50–56 onto screen 62 or, alternatively, onto screen 68. FIG. 6 illustrates the orientation of the PLZT positive screens 40–46 within housing B. The number of image reversals to screens 62 and 68 produce a non-inverted form of the original color image. It is noted that the arrows indicate that each of the PLZT positive screens is oriented the same way so that they are projected in oriented fashion through the system, best illustrated in FIG. 3, onto the exposed transparent screen 62. If by chance there has been an inversion, one of the screens 40–46 can be removed and reoriented to reconstitute the proper image on screen 62. If the exposure of the screens 40–46 is remote from the projection system, registration marks may be placed on the screen so that they are properly registered in housing B for proper projection onto the screens 62, 68. Of course, if the housing B also includes the exposure system, then there should be no reason to reorient the screens 40–46 after the subimages have been created therein by the procedure outlined above.

Various changes can be made in the lens system and projecting system of the illustrated embodiment of the present invention without departing from the intended spirit and scope of the invention. These changes would be made to accommodate for the different optical lengths between the opaque screen 68 and transparent screen 62 of FIG. 1. Also, the relative location of housings B and C as depicted in FIG. 3 can be adjusted to accommodate for different optical path lengths from the PLZT screen 40 and screens 68 and 62, respectively. Basically, the transmitted color separation print of each of the basic colors, and optionally the black color separation print, are used to create corresponding subimages in the PLZT positive screens 40–46. Corresponding primary light sources are then used with these screens to simultaneously create the subimages in color rays which are projected and focused onto a planar surface to reconstitute the original transmitted color image. As can be seen, there is no photographic developing process required in reconstituting the transmitted color separation prints. By controlling the polarization of the PLZT screens, the contrast in the various colors can be controlled to reconstitute the color image in proper balance. Only optical means are used in the reconstitution procedure. The time required and the equipment and chemicals required for this procedure are substantially less than procedures heretofore used in reconstituting the original color image at television stations or a newspaper printing plant. Of course, the system can be modified to enlarge or reduce the size of the image. In this manner, a relatively large image can be created from relatively small transmitted color separation prints. Other modifications can be made within the scope of the present invention.

Having thus defined my invention, I claim:

1. A method of creating a color reconstituted image on a planar surface and corresponding to a selected color image, said method comprising the steps of:

a. providing at least three image elements each having a two-tone subimage determined by the portions of said selected color image including a basic color, with one of said tones corresponding to the lack of said basic color in a portion of said selected color image and the other of said tones corresponding to the presence of said basic color in a portion of said selected color image;

b. providing for each of said image elements a generally flat transparent screen formed from a layer of material capable of forming an image therein when exposed to a light image while an electro-magnetic field is created within said layer;

c. focusing said subimage on each of said image elements onto one of said flat screens while an electro-magnetic field is created in said layer of said one screen, whereby each of said subimages is reproduced in the layer of one of said transparent screens;

d. directing a light source of one of said basic colors through each of said screens, with said basic color corresponding to the basic color used in producing the subimage of each of said screens and thus producing at least three basic color light ray images corresponding to the basic colors of said selected color image;

e. focusing said light ray images simultaneously onto said planar surface; and, f. adjusting the positions of said light ray images for registering said light ray images on said planar surface.

2. A method as defined in claim 1 wherein said three image elements are each an image screen formed from a layer of material capable of forming an image therein when exposed to a light image while an electro-magnetic field is created within said layer; and including the additional step of:

g. producing in said image sscreens of said image elements a two-tone subimage determined by the portions of said selected color image including a basic color.

3. A method as defined in claim 1 wherein said transparent layers are formed from a ceramic material.

4. A method of creating a color reconstituted image on a planar surface and corresponding to a selected color image, said method including the following steps:

a. providing for each of three basic colors a flat transparent screen formed from a layer of material capable of forming an image therein when exposed to a light image while an electro-magnetic field is created within said layer;

b. forming a two-tone image in each of said screens with the image of each screen corresponding to the pattern of a basic color in said selected color image;

c. directing a light source of one of said basic colors through each of said transparent screens, with said basic color corresponding to the basic color of the image of each of said screens and thus producing at least three basic color light ray images corresponding to the basic colors of said selected color image;

d. focusing said light ray images simultaneously onto said planar surface; and, e. adjusting the positions of said light ray images for registering said light ray images on said planar surface.

5. A method of creating a color reconstituted image on a planar surface and corresponding to a selected color image, said method comprising:

a. providing at least three sets of electrical signals each corresponding to a two-tone subimage determined by the portions of said selected image including a basic color, with one of said tones corresponding to the lack of said basic color in a portion of said selected image and the other of said tones corresponding to the presence of said basic color in a portion of said selected image;

b. transmitting said signals to a remote location;

c. forming two-tone image elements for each of said signals at said remote location;

d. providing for each of said image elements a generally flat transparent screen formed from a layer of material capable of forming an image therein when exposed to a light image while an electro-magnetic field is created within said layer;

e. focusing said subimage on each of said image elements onto one of said flat screens while said one screen is subjected to an electro-magnetic field, whereby each of said subimages is reproduced in the layer of one of said transparent screens;

f. directing a light source of one of said basic colors through each of said screens, with said basic color corresponding to the basic color used in producing the subimage of each of said screens and thus producing at least three basic color light ray images corresponding to the basic colors of said selected color image;

g. focusing said light ray images simultaneously onto said planar surface; and, h. adjusting the positions of said light ray images for registering said light ray images on said planar surface.

6. A method of creating a color reconstituted image on a planar surface and corresponding to a selected color image, said method comprising:

a. producing at least three sets of electrical signals each corresponding to a two-tone subimage determined by the portions of said selected image including a basic color, with one of said tones corresponding to the lack of said basic color in a portion of said selected image and the other of said tones corresponding to the presence of said basic color in a portion of said selected image;

b. transmitting said signals to a remote location;

c. forming two-tone image elements for each of said signals at said remote location;

d. providing for each of said image elements a generally flat transparent screen formed from a layer of material capable of forming an image therein when exposed to a light image while an electro-magnetic field is created within said layer;

e. focusing said subimage on each of said image elements onto one of said flat screens while said one screen is subjected to an electro-magnetic field, whereby each of said subimages is reproduced in the layer of one of said transparent screens;

f. providing a second transparent screen as defined in step (d) for each of said basic colors;

g. focusing by a light source the subimage from each of said first mentioned screens onto one of said second screens;

h. creating an electro-magnetic field in said second screens during said focusing step (g) whereby said subimages are reproduced in said second screen in reversed form;

i. directing a light source of one of said basic colors through each of said second screens, with said basic color corresponding to the basic color used in producing the subimage of each of said second screens and thus producing at least three basic color light ray images corresponding to the basic colors of said selected color image;

j. focusing said light ray images simultaneously onto said planar surface; and, k. adjusting the positions of said light ray images for registering said light ray images on said planar surface.

7. An apparatus for creating a color reconstituted image on a planar surface and corresponding to a selected image, said apparatus comprising: means for producing two-tone subimages of at least three basic color separation prints; said subimages each corresponding to a basic color and having a first tone corresponding to the lack of said basic color in portions of said selected image and a second tone corresponding to the presence of said basic color in portions of said selected image; an image element for each of said subimages, said image elements each comprising a generally flat transparent layer of material capable of forming an image therein when exposed to a light image while an electro-magnetic field is created within said layer; means associated with said layers for creating electro-magnetic fields in said layer; means for focusing said subimage of said positives onto said layer while said field creating means creates said electro-magnetic field whereby said subimages are transferred to one of said image elements; means for creating a light source corresponding in color to each of said primary colors; means for directing the one of said light sources corresponding in color to a particular subimage through the image element having said particular subimage whereby light ray images for each basic color are created; and means for simultaneously focusing said light ray images onto said planar surface.

8. An apparatus as defined in claim 7 including erasing means for erasing said subimages from said image elements, said erasing means including means for directing a uniform light source onto said layers of said image elements and means for energizing said field creating means while said uniform light source is directed to said image elements.

9. An apparatus as defined in claim 8 wherein said transparent layers are formed from a ceramic material.

10. An apparatus as defined in claim 9 wherein said ceramic material is a lead zirconate titanate material.

11. An apparatus as defined in claim 7 wherein said transparent layers are formed from a ceramic material.

12. An apparatus as defined in claim 11 wherein said ceramic material is a lead zirconate titanate material.

13. An apparatus for creating a color reconstituted image on a planar surface and corresponding to a selected image, said apparatus comprising: means for producing two-tone subimage positives of at least three basic color separation prints, said positives each corresponding to a basic color and having a first tone corresponding to the lack of said basic color in portions of said selected image and a second tone corresponding to the presence of said basic color in portions of said selected image; an image element for each of said positives, said image elements each comprising a generally flat transparent layer of material capable of forming an image therein when exposed to a light image while an electro-magnetic field is created within said layer; means associated with said layers for creating electro-magnetic fields in said layers; means for focusing said subimage of said positives onto said layer while said field creating means creates said electro-magnetic field whereby said subimages are transferred to one of said image elements; means for focusing said subimages in said image elements onto one of at least three second image elements, said second image elements each comprising a generally flat transparent layer of material capable of forming an image therein when exposed to a light image while an electro-magnetic field is created with said layer of said second image elements; means associated with said layers of said second image elements for creating electro-magnetic fields in said layers of said second image elements; means for energizing said field creating means of said second image elements while said subimages are focused thereon whereby said subimages are transferred to said second image elements as positive subimages; means for creating a light source corresponding in color to each of said primary colors; means for directing the one of said light sources corresponding in color to a particular positive subimage through the second image element having said particular positive subimage whereby light ray images for each basic color are created; and means for simultaneously focusing said light ray images onto said planar surface.

14. An apparatus as defined in claim 13 including erasing means for erasing said subimages from said image elements, said erasing means including means for directing a uniform light source onto said layers of said image elements and means for energizing said field creating means while said uniform light source is directed to said image elements.

15. An apparatus as defined in claim 14 wherein said transparent layers are formed from a ceramic material.

16. An apparatus as defined in claim 15 wherein said ceramic material is a lead zirconate titanate material.

17. An apparatus as defined in claim 13 wherein said transparent layers are formed from a ceramic material.

18. An apparatus as defined in claim 17 wherein said ceramic material is a lead zirconate titanate material.

* * * * *